No. 670,879. Patented Mar. 26, 1901.
E. W. HUBBARD.
PEA PLANTER.
(Application filed July 29, 1896.)
(No Model.)
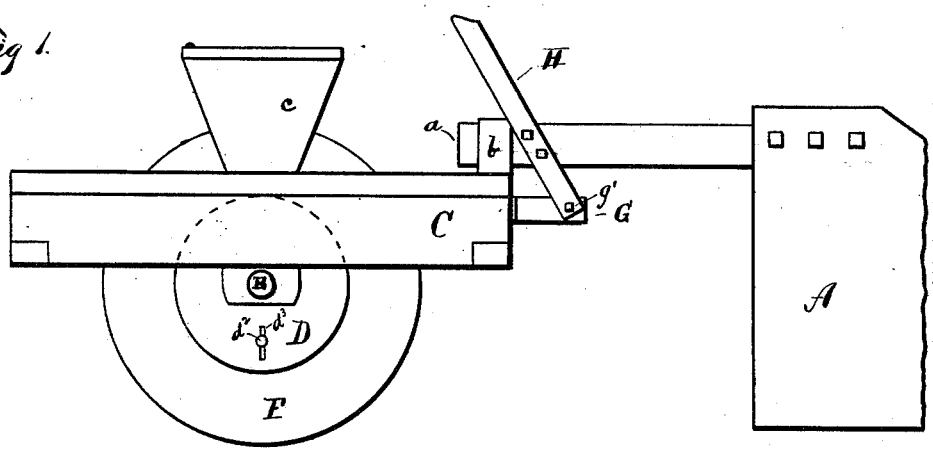
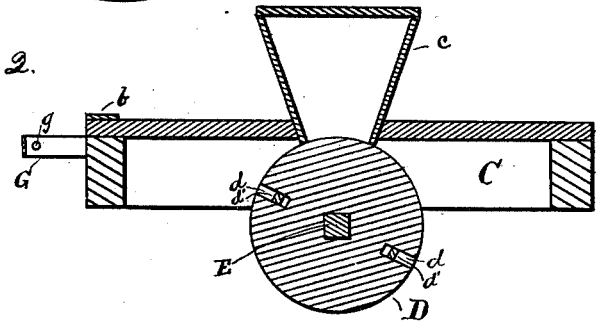
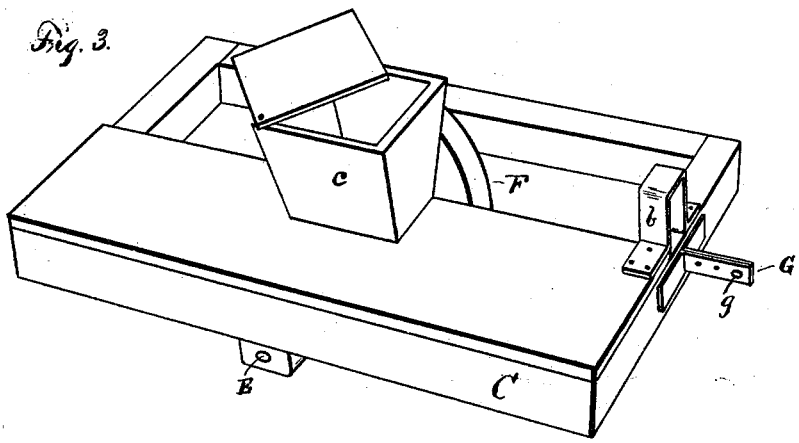
WITNESSES:
Otis D. Swett.
H. A. Daniels
INVENTOR
Edward W. Hubbard,
BY
Thomas P. Simpson
ATTORNEY.

UNITED STATES PATENT OFFICE.

EDWARD W. HUBBARD, OF BRIGHTSVILLE, SOUTH CAROLINA.

PEA-PLANTER.

SPECIFICATION forming part of Letters Patent No. 670,879, dated March 26, 1901.

Application filed July 29, 1896. Serial No. 600,866. (No model.)

*To all whom it may concern:*

Be it known that I, EDWARD W. HUBBARD, a citizen of the United States, residing at Brightsville, in the county of Marlboro and State of South Carolina, have invented certain new and useful Improvements in Pea-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to open a furrow and plant peas at one operation, all by means of a plow and planter detachably connected, as hereinafter described.

Figure 1 of the drawings is a side elevation with the front end of the furrow-opener broken away; Fig. 2, a vertical longitudinal section, and Fig. 3 a perspective view of the planter attachment.

In the drawings, A represents a furrow-opener of any desired form and which is adapted to open a furrow in which the peas are to be dropped at any suitable or preferred distance apart. The rear extension $a$ of its beam is made to enter a yoke $b$, which is fastened at its lower ends to a frame C, the latter containing a hopper $c$, tapering toward the bottom, which is open for the outlet of the peas. In this bottom opening rotates the dropper-wheel D, which has on its periphery one or more cups adapted to contain seed enough for one hill. Each of these cups $d$ has a false bottom $d'$, which is movable up or down in the cup to regulate the quantity of seed to a hill and is held at any desired adjustment by a set-screw $d^2$, which is movable in the slot $d^3$. The dropper-wheel is fast on a shaft E, which carries a furrow-wheel F, that may be larger or smaller, according to the depth of furrow required, the wheel forming a depth-gage for the furrow-opener.

G is a plate doubled at the middle and the ends spread out in opposite directions and bolted to the front of the frame C, while the two arms brought together are provided with a hole $g$, through which passes a bolt $g'$, that holds together the lower ends of the handles H H, which are also bolted to the beam. This brings the plate about the middle of the furrow made by the furrow-opener, so that the ground-wheel F runs in the side of furrow opposite to the side in which the peas are dropped.

I am well acquainted with the devices shown and described in United States Patents Nos. 78,171, 107,156, and 218,271; but they are corn-planters, and not adapted to plant peas. They have the planters in front and not in the rear as I do, my pea-planter being attached to a rear extension of the plow-beam, so that both plow and planter may be simultaneously lifted around trees, stumps, or stones, as well as at the ends of rows. The labor of a man is saved. Again, I have but one bottom to my hopper, and the feed-wheel goes only up to the opening in this bottom, whereby the very last pea in the hopper is fed accurately therefrom.

What I claim as new is—

A planter comprising a frame, a supporting-wheel mounted within the frame at one side, a dropping-wheel mounted on the axle of the supporting-wheel about the middle of the width of the frame, a hopper upon the said frame above the dropping-wheel, a yoke mounted upon the front of the furrow-opener, a beam loosely working in the yoke and having a plow at its free end and handles rigidly secured to the beam and having their ends pivoted to the front end of the frame, substantially as described.

In testimony whereof I affix my signature in presence of two witnesses.

EDWARD W. HUBBARD.

Witnesses:
T. I. ROGERS,
J. L. BRIGMAN.